Jan. 13, 1959 A. E. BREWSTER 2,868,891

MAGNETIC RECORDING DEVICE

Filed Sept. 21, 1953 2 Sheets-Sheet 1

Inventor
A. E. BREWSTER
By R P Morris
Attorney

Jan. 13, 1959 A. E. BREWSTER 2,868,891

MAGNETIC RECORDING DEVICE

Filed Sept. 21, 1953 2 Sheets-Sheet 2

Inventor
A. E. BREWSTER

United States Patent Office 2,868,891

Patented Jan. 13, 1959

2,868,891

MAGNETIC RECORDING DEVICE

Arthur Edward Brewster, London, England, assignor to International Standard Electric Corporation, New York, N. Y., a corporation of Delaware Application September 21, 1953, Serial No. 381,440

14 Claims. (Cl. 179—100.2)

This invention relates to apparatus for removably mounting a recording medium container in engagement with medium driving mechanism and recording and/or reproducing means and for dismounting the same from such engagement.

The preferred embodiment of the invention was developed for incorporation in a tape recording machine using tape containers of the type having two flat sides separated by a distance a little greater than the width of the tape, which is in a continuous band emerging from the container along the top edge so that it can be engaged by a recording and/or reproducing means and by driving means for advancing the tape. This machine records data to be worked on by automatic computing equipment, where recording under control of operators located away from the recording machine was a requirement, a number of recording machines being housed in an apparatus room under the care of a technical attendant.

In such circumstances it is necessary to have a ready means of indicating to the attendant when a tape container is due for removal and to guard against inadvertent or negligent re-loading of a container due for removal.

The circumstances which call for the removal of the tape box vary according to the circumstances of the system with which the recording equipment is used, for instance, a box may be required to contain only one batch of recorded information relating to a particular matter. When this is recorded and possibly also checked by reproducing and possibly further re-recorded in checked form it may well be that no other recorded matter can be tolerated, on that box of tape, whether or not the whole recording space is used. The operator will then depress a key provided for the purpose or record a special code symbol to be recognised on reproduction so as to initiate a signal, and the tape box release mechanism will be arranged to respond to the operator's key operation or the said signal as the case may be.

Other applications may require ejection of the tape box in different circumstances and many methods of conveying the initiating signal to the ejection mechanism are possible.

According to the invention, therefore, there is provided equipment for the recording, storage and reproduction of electric signals comprising an endless belt of magnetic tape, recording and/or reproducing means, drive and guide means for drawing the tape past the recording and/or reproducing means, a single tape storage container of slightly greater width than the tape and the tape width being across the width of the container, and means for automatically ejecting the container from its operating position in relation to the said tape drawing and guide means and to the said recording and/or reproducing means, into an out-of-operation position.

According to a further feature of the invention, there is provided apparatus for removably mounting a flat recording tape container in engagement with tape driving mechanism and a recording and/or reproducing head comprising a vertical structure with lugs adapted to engage an upper edge of the container and retain recording tape in the container in engagement with the said driving mechanism head and/or heads. A first movable member adapted to engage a lower edge of the container, first spring means urging the said first member upwards with insufficient force to lift the weight of a container resting on the first member, a second movable member, abutments on the first and second members engaging one another in one direction, second spring means urging the second member upwards with a force sufficient, when the said abutments are engaged to supplement the force of the first spring means to an extent necessary to lift the weight of a container resting on the first member whereby such container may be engaged and held by the said lugs means for moving the said abutments out of engagement to disconnect the first and second members whereby the first spring is unable to support the weight of the container which drops out of engagement with the said lugs and means for preventing the re-engagement of the said abutments whilst the first member is held down by the weight of a container.

According to a still further feature of the invention, there is provided apparatus for mounting a detachable unitary flat recording tape container in engagement with tape driving mechanism and a recording and/or reproducing head and for dismounting such container from such engagement comprising a member adapted to engage a lower edge of the container and spring means urging the said member and the said container into engagement with a lug or lugs adapted to locate the container in engagement with the said driving mechanism and head and/or heads, means for reducing the strength of the spring means below that necessary to support the weight of the container which falls out of engagement with the said driving mechanism and head and/or heads, and means for restoring the strength of the spring means when, and only when, the said member is allowed to rise to a position above that which it assumes when supporting a container engaged by the said lug or lugs.

The said embodiment of the invention will be described with reference to the accompanying drawings in which.

Figures 1, 2, 3, 4, 5:
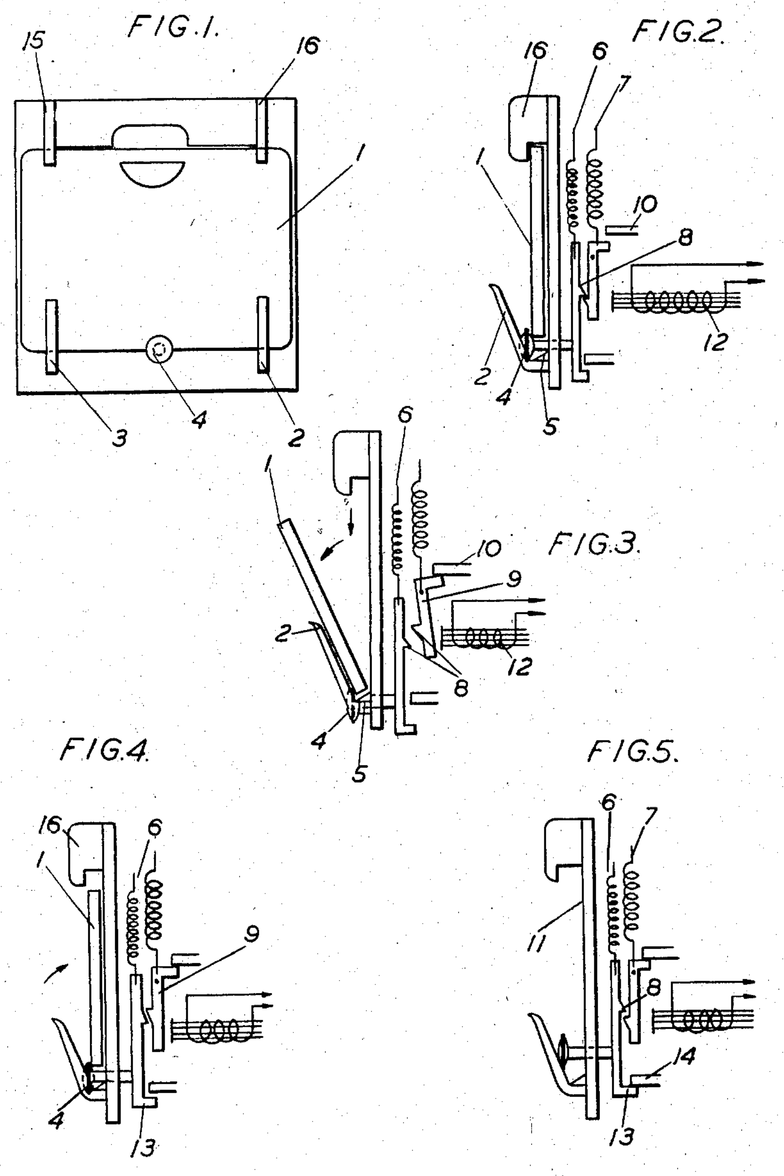
Fig. 1 is a view in elevation of a container in position on the apparatus.
Fig. 2 is a section through the container and the controlling mechanism.
Figs. 3, 4 and 5 are sectional views showing the mechanism in three different positions.

Referring to Figs. 1 and 2, a box 1 is seen supported in position by a centrally placed pin 4. The pin 4 is supported by the springs 6 and 7 so as to retain the container in its operating position in which the box engages supporting lugs 15 and 16. The springs act together by the co-operation of the teeth 8.

The box is manually loaded into the position shown in Figs. 1 and 2 by feeding in the lower end first, with the box slanted outwards to clear the lugs 15 and 16; depressing the box to lower the pin 4 below the rest position shown in Figs. 1 and 2, pressing the box backwards against the body of the recording machine and then letting it move upwards under the action of pin 4 and springs 6 and 7 to secure the top of the box behind the lugs 15 and 16.

When the box is required to be ejected the release magnet 12 is momentarily energised and the teeth 8 become disengaged as seen in Fig. 3. The rotation of the piece 9 is limited by the stop 10. The upward force due to the single spring 6 is insufficient to support the weight of the box, which depresses the pin 4 and comes to rest on two rubber blocks such as 5, each of which is inside one of the brackets 2 and 3. These blocks are so shaped as to cause the box to tilt outwards until it is resting against the brackets 2 and 3 which constitute a cradle.

As soon as the release magnet 12 is de-energised the piece 9 rotates into the position shown in Fig. 4.

When the box is removed from the cradle the spring 6 is free to contract and the piece 13, together with the supporting pin 4 rises into the position shown in Fig. 5; the upward motion of the piece 13 being limited by the stop 14. The relative positions of the teeth 8 are now such that a box placed in position on the apparatus will be supported by the combined action of the springs 6 and 7 as already described with reference to Fig. 1.

Referring again to Fig. 4, if the box 1 is through error again rotated into the vertical plane subsequent to ejection the spring pressure will, as has already been described, be insufficient to raise the container into its position behind the supporting lugs 15 and 16. There is therefore a safeguard against inadvertent recording on an already "full" tape.

The release magnet circuit may be either under the control of an operator using a spring key or energised automatically upon the receipt of a "tail" signal when no further recording on the tape is desired.

A master-switch incorporated in the power supply to the equipment may be controlled by a spring-loaded pin set in the face of the equipment at 11. Then, when the container is in its operating position shown in Fig. 1, the pin will be depressed closing the master switch. However, upon the ejection on the container the pin will extend opening the master switch and immobilising the apparatus.

Figure 6:
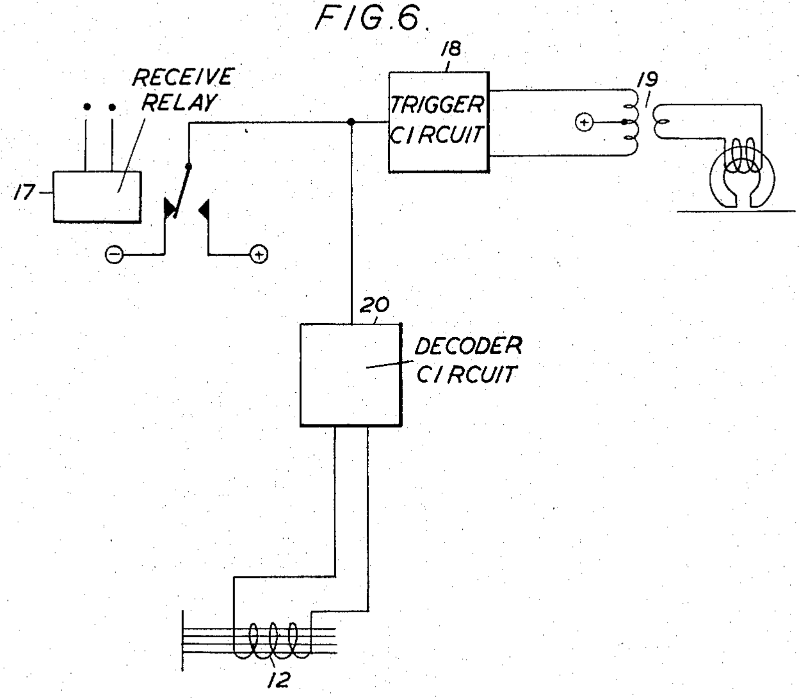
Fig. 6 shows diagrammatically an arrangement for initiating the ejection of the container on receipt of a chosen code character from the recording operator's position.

In one arrangement which has been developed incorporating the invention, recording is in the form of teleprinter code which is recorded on magnetic tape by saturation with one polarity or the other for the "mark" or "space" condition respectively. This arrangement is shown diagrammatically in Fig. 6. The signals are received on a teleprinter receive magnet 17 of conventional type whose contacts operate a bi-stable trigger circuit 18 the output of which furnishes the flux for energising the magnet recording head, by means of the transformer 19.

When it is required to operate the container release magnet automatically a character not normally required to be recorded is chosen as the release signal and this character is transmitted by the record operator.

To recognise this signal it is necessary to have a decoder 20 which may be the equivalent of the receiving portion of a teleprinter (the magnet is present in any event) with the type head replaced by a mechanism for closing contacts on receipt of the chosen character. As this is a conversion well within the competence of those skilled in the art, it is unnecessary to give precise details of the simplification of the teleprinter receive mechanism which can be made when only one character need be responded to and when no printing is required.

There are various electronic decoder circuits which may be used for the recognition of the chosen character and the operation of the magnet 12. One such arrangement consists of a chain of gaseous discharge trigger tubes equal in number to the elements of the teleprinter code which is reset to a starting condition by the start or the stop element of the code. The firing of one tube primes the following tube and a primed tube is fired by a pulse of the correct polarity applied to the trigger electrode.

A driver circuit is required to produce a pulse on one terminal for a mark signal and on the other terminal for a space signal. This may consist of a pulse generator synchronised to the receiver code elements which passes pulses to the recording receive relay whose contacts divert the pulses from the pulse generator to one of the said terminals or the other according to whether the relay is in the mark or the space condition. The pulse input terminals of the gas tube counting stages are strapped respectively to one or other of the said terminals according to the code combination representing the chosen character so that the sequence of discharges of the tubes can only reach the last tube when the chosen character code is received. It is arranged that the firing of the last tube operates a relay to apply current to the winding 12 which operates the container release mechanism. If the counting train fails to fire all its tubes it is automatically reset for firing at the first tube on receipt of the next character.

While the principles of the invention have been described above in connection with specific embodiments, and particular modifications thereof, it is to be clearly understood that this description is made only by way of example and not as a limitation on the scope of the invention.

What I claim is:

1. Equipment for the recording, storage and reproduction of electric signals comprising a recording medium, recording and/or reproducing means, drive and guide means for drawing said medium past the recording and/or reproducing means, a single recording medium storage container of slightly greater width than the width of said medium, an operating position for said container and means for automatically ejecting the container into an out-of-operation position, said ejecting means being under the control of predetermined said signals.

2. Equipment as claimed in claim 1 further comprising means for supporting the ejected container in close proximity to the remainder of the equipment.

3. Equipment as claimed in claim 2 further comprising latch means for preventing the re-engagement of the container after ejection, with the said medium driving means and guide means and the said recording and/or reproducing means said latch means adapted to remain out of latching contact until the container is first removed from the supporting means.

4. Apparatus for removably mounting a flat recording tape container in engagement with tape driving mechanism therefor and translation means comprising a vertical structure with lugs adapted to engage an upper edge of said container and retain recording tape in said container in engagement with the said driving mechanism and said translation means, a first movable member adapted to engage a lower edge of the container, first spring means for urging said first member upwards but having insufficient force to lift the weight of a container resting on said first member, a second movable member, abutments on said first and second members engaging one another in one direction, second spring means for urging said second member upwards with a force sufficient, when said abutments are engaged to supplement the force of said first spring means to an extent necessary to lift the weight of said container resting on said first member whereby such container may be engaged and held by said lugs, means for selectively moving said abutments out of engagement to disconnect said first and second members whereby said first spring is unable to support the weight of said container which drops out of engagement with said lugs and means for preventing the re-engagement of said abutments whilst the first member is held down by the weight of said container.

5. Apparatus for mounting a detachable unitary flat recording tape container in engagement with tape driving mechanism and a recording and/or reproducing head and for dismounting such container from such engagement comprising a member adapted to engage a lower edge of the container and spring means urging the said member and the said container into engagement with a lug or lugs adapted to locate the container in engagement with the said driving mechanism and head and/or heads, means for reducing the strength of the spring means below that necessary to support the weight of the container which falls out of engagement with the said driving mechanism and head and/or heads, and means for restoring the strength of the spring means when, and only when, the said member is allowed to rise to a position above that which it assumes when supporting a container engaged by the said lug or lugs.

6. Apparatus as claimed in claim 5 with means for supporting a container out of engagement with the said drive mechanism and head and/or heads when it falls after reduction of the strength of the said spring means.

7. Apparatus as claimed in claim 5 in which the said member cannot rise enough for the restoration of the strength of the spring means unless the said container is removed from the said supporting means.

8. Apparatus as claimed in claim 4 with means for tilting the top edge of a container away from the said vertical structure when it falls free from the said lugs after the said abutments have been moved out of engagement.

9. Apparatus as claimed in claim 6 with means for supporting the said container in an outwardly slanting position after it has been tilted as aforesaid.

10. Apparatus as claimed in claim 4 in which the second member is mounted on a pivot at a point remote from the said abutments and is rotated about that pivot to disengage the said abutments.

11. Apparatus as claimed in claim 4 in which the second member is able to move bodily between certain limits in a vertical direction and means for restraining its upward movement after disengagement of the abutments.

12. Apparatus as claimed in claim 11 with means for restraining upward movement of the first member when not held down by the weight of a container in such a position that the abutments move into engaging relationship when the second member is moved upwards to the limit permitted by its restraining means.

13. Apparatus as claimed in claim 4 in which the second member is moved away from the first member by an electro-magnet, to disengage the said abutments.

14. Apparatus as claimed in claim 4 in which the abutments consist of opposing saw-tooth projections, one on the first member and the other on the second member which engage by mutual contact of their steep faces but are displaced one from another when moved relatively to one another in a vertical direction with their sloping faces in contact until their steep faces again engage whereby the said abutments automatically re-engage after disengagement when the first member is allowed to rise on removal of a container.

References Cited in the file of this patent

UNITED STATES PATENTS 2,681,950 Owens _______________ June 22, 1954

UNITED STATES PATENT OFFICE

CERTIFICATE OF CORRECTION

Patent No. 2,868,891 January 13, 1959

Arthur Edward Brewster

It is hereby certified that error appears in the above numbered patent requiring correction and that the said Letters Patent should read as corrected below.

In the heading to the printed specification, between lines 6 and 7, insert "Claims priority, application Great Britain September 22, 1952".

Signed and sealed this 8th day of September 1959.

(SEAL)

Attest:

KARL H. AXLINE

Attesting Officer

ROBERT C. WATSON

Commissioner of Patents